US007775040B2

(12) United States Patent
Khalil

(10) Patent No.: US 7,775,040 B2
(45) Date of Patent: Aug. 17, 2010

(54) BIDIRECTIONAL HYDRAULIC TRANSFORMER

(75) Inventor: Rabie E. Khalil, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 244 days.

(21) Appl. No.: 11/907,884

(22) Filed: Oct. 18, 2007

(65) Prior Publication Data

US 2008/0104955 A1 May 8, 2008

Related U.S. Application Data

(60) Provisional application No. 60/857,491, filed on Nov. 8, 2006.

(51) Int. Cl.
*F16D 31/02* (2006.01)

(52) U.S. Cl. ........................................ 60/419; 60/414

(58) Field of Classification Search .................. 60/414, 60/419, 475, 476
See application file for complete search history.

(56) References Cited

U.S. PATENT DOCUMENTS

| | | | | |
|---|---|---|---|---|
| 3,113,581 | A | 12/1963 | Presnell | |
| 4,026,107 | A * | 5/1977 | Kosek et al. | 60/419 |
| 4,068,728 | A | 1/1978 | Subrick | |
| 4,108,198 | A | 8/1978 | England | |
| 4,261,431 | A | 4/1981 | Hawbaker | |
| 4,553,391 | A * | 11/1985 | Reinhardt | 60/419 |
| 5,285,641 | A | 2/1994 | Goto et al. | |
| 5,381,661 | A | 1/1995 | Malina | |
| 5,852,933 | A | 12/1998 | Schmidt | |
| 6,125,828 | A | 10/2000 | Hu | |
| 6,370,873 | B1 * | 4/2002 | Schaich et al. | 60/419 |
| 6,378,301 | B2 * | 4/2002 | Endo et al. | 60/419 |
| 6,438,951 | B2 * | 8/2002 | Morgan | 60/419 |
| 6,497,558 | B1 | 12/2002 | Hale | |
| 6,854,268 | B2 * | 2/2005 | Fales et al. | 60/414 |
| 6,857,441 | B2 | 2/2005 | Flavelle | |
| 6,887,045 | B2 | 5/2005 | Schaeffer | |
| 2002/0104313 | A1 | 8/2002 | Clarke | |
| 2006/0051223 | A1 | 3/2006 | Mark et al. | |
| 2007/0079609 | A1 | 4/2007 | Brinkman et al. | |

FOREIGN PATENT DOCUMENTS

| | | |
|---|---|---|
| GB | 1310645 | 3/1973 |
| JP | 1-280132 | 11/1989 |
| WO | WO 88/03098 | 5/1988 |
| WO | WO 88/03123 | 5/1988 |

* cited by examiner

*Primary Examiner*—Michael Leslie
(74) *Attorney, Agent, or Firm*—Finnegan, Henderson, Farabow, Garrett & Dunner LLC

(57) ABSTRACT

A hydraulic transformer is disclosed. The hydraulic transformer may have a housing, and a first pumping mechanism disposed within the housing and rotated in a first direction by fluid pressure. The hydraulic transformer may also have a second pumping mechanism disposed within the housing and rotated by the first pumping mechanism in the first direction to increase the fluid pressure. The hydraulic transformer may further have a common shaft connecting the first and second reversible pumping mechanisms. One of the first and second pumping mechanisms may also be rotated in a second direction opposite the first by fluid pressure. The other of the first and second pumping mechanisms may also be rotated by the one of the first and second pumping mechanisms in the second direction to increase the fluid pressure.

20 Claims, 3 Drawing Sheets

| TRANSFORMER CONTROL CHART | | | | | | | | | |
|---|---|---|---|---|---|---|---|---|---|
| PISTON MOTION DIRECTION-PRESSURE | VALVE CONDITION | | | | O = OPEN C = CLOSED | | # = CHAMBER CONNECTED TO 62 | | CLUTCH |
| | 52 | 67 | 74 | 76 | 80 | 84 | 88 | 94 | |
| RETRACT - LEVEL 1 | C | C | O | O | O | O | C | C | DISENGAGED |
| RETRACT - LEVEL 2 | 0 - 42 | O | O | O | C | O | O | C | DISENGAGED |
| RETRACT - LEVEL 3 | 0 - 42 | C | O | O | C | O | O | C | DISENGAGED |
| RETRACT - LEVEL 4 | 0 - 42 | C | O | O | C | O | O | C | ENGAGED |
| EXTEND - LEVEL 1 | C | C | O | O | O | O | C | C | DISENGAGED |
| EXTEND - LEVEL 2 | 0 - 40 | O | O | C | O | O | C | O | DISENGAGED |
| EXTEND - LEVEL 3 | 0 - 40 | C | O | C | O | O | C | O | DISENGAGED |
| EXTEND - LEVEL 4 | 0 - 40 | C | O | C | O | O | C | O | ENGAGED |

*FIG. 3*

BIDIRECTIONAL HYDRAULIC TRANSFORMER

This application is based on and claims the benefit of priority from U.S. Provisional Application No. 60/857,491, filed Nov. 8, 2006.

TECHNICAL FIELD

The present disclosure relates generally to a hydraulic transformer, and more particularly, to a bidirectional hydraulic transformer usable for energy recuperation.

BACKGROUND

Hydraulic actuators such as cylinders having an extendable and retractable rod and piston are utilized to accomplish a variety of tasks. These actuators are connected to a pump that provides pressurized fluid to chambers within the actuators. As the pressurized fluid moves into or through the chambers, the pressure of the fluid acts on hydraulic surfaces of the chambers to effect movement of the rod and piston. When the pressurized fluid is drained from the chambers it is returned to a low pressure tank. The speed at which the fluid flows into and out of the chambers affects the extension and retraction speeds of the actuator, while the pressure in contact with the hydraulic surfaces affects the actuation force thereof.

One problem associated with this type of hydraulic arrangement is the energy wasted when pressurized fluid flow is throttled through a valve in order to control movement speed of the actuator. In particular, because the movement speed of the actuator is directly related to the flow rate of fluid entering and leaving the chambers thereof, to move the actuator at a slow speed, the flow of fluid must be throttled to a lower rate than, as compared to high speed movements of the actuator. By throttling the flow of fluid, energy from the fluid is converted to heat, which must then be dissipated to the environment. In this situation, energy that could have been utilized to move the actuator is lost from the fluid, and additional energy must be utilized to remove the heat from the system.

Another problem associated with this type of hydraulic arrangement involves the magnitude of the pressure required to move the actuators, particularly when the actuators are heavily loaded. Specifically, if the actuator is intended to move heavy loads quickly, the pump supplying fluid to the actuators must be sized to provide very high flow rates at relatively high pressures. This requirement increases the size of the pump and, subsequently, the overall cost of the machine.

In addition, when the pressures are significantly high, precise movement control of the actuators can be difficult, and not all actuators powered by a common pump require the same high pressure. As a result, in some situations, the high pressure must be throttled down to meet the requirements of control and low pressure actuators. As described above, throttling of the pressurized fluid is an inefficient way to achieve the desired result.

Further, the efficiency of a system employing such a large pump is low due to unused pressurized fluid being wasted. In particular, the fluid draining from the actuator chambers to the tank often has a pressure greater than the pressure of the fluid already within the tank. In fact, when under load, this pressure can be much greater than the tank pressure. As a result, the higher pressure fluid draining into the tank still contains some energy that is wasted upon entering the low pressure tank. This wasted energy reduces the efficiency of the associated hydraulic system.

One attempt at addressing some of these pressure difficulties is described in U.S. Patent Publication No. 2002/0104313 (the '313 publication) disclosed by Clarke on Aug. 8, 2002. The '313 publication describes a hydraulic transformer that uses a pair of variable displacement gear pumps. The two gear pumps are disposed on a common shaft and receive fluid in parallel from a common high pressure source. The outlet of a first of the gear pumps is fluidly connected to a hydraulic piston, while the second of the gear pumps is fluidly connected to a tank. As the fluid flows through the second gear pump to the tank, energy is removed from the fluid and utilized to turn the common shaft and connected first gear pump. As the fluid flows through the first gear pump, the torque applied to the common shaft by the second gear pump is utilized to increase the pressure of the fluid flowing to the hydraulic piston. In this manner, although the pressure of the fluid supplied to the hydraulic transformer may be less than the pressure required to move the hydraulic piston, the hydraulic transformer accommodates this deficiency by increasing the pressure of a portion of the supplied flow high enough for useful operation. With this configuration, lower pressure actuators may receive flow directly from the source without throttling, while higher pressure actuators may receive flow from the transformer having pressure adequate to move high loads.

Although the hydraulic transformer described in the '313 publication may alleviate the need for throttling or an oversized high-pressure pump, its use may be limited. Specifically, the hydraulic transformer of the '313 publication is only unidirectional, with fluid flowing only from the source to the piston. Because of this limitation, source pressure amplification and energy recuperation from draining chambers of the piston may be impossible with the hydraulic transformer. In addition, because the hydraulic transformer is variable displacement, the cost and complexity of the transformer may be excessive.

The disclosed hydraulic transformer is directed to overcoming one or more of the problems set forth above.

SUMMARY

In one aspect, the present disclosure is directed to a hydraulic transformer. The hydraulic transformer may include a housing, and a first pumping mechanism disposed within the housing and rotated in a first direction by fluid pressure. The hydraulic transformer may also include a second pumping mechanism disposed within the housing and rotated by the first pumping mechanism in the first direction to increase the fluid pressure. The hydraulic transformer may further include a common shaft connecting the first and second reversible pumping mechanisms. One of the first and second pumping mechanisms may also be rotated in a second direction opposite the first by fluid pressure. The other of the first and second pumping mechanisms may also be rotated by the one of the first and second pumping mechanisms in the second direction to increase the fluid pressure.

In another aspect, the present disclosure is directed to hydraulic circuit. The hydraulic circuit may include an actuator having a first pressure chamber and a second pressure chamber. The hydraulic circuit may also include a hydraulic transformer having first and second pumping mechanisms connected to receive in parallel fluid forced from the first pressure chamber. The transformer may also be configured to increase the pressure of a portion of the fluid forced from the first pressure chamber, and return the remaining portion of the fluid forced from the first pressure chamber to the second pressure chamber.

In yet another aspect, the present disclosure is directed to a method of recuperating hydraulic energy from an actuator. The method may include receiving a first flow of fluid from the actuator, and receiving a second flow of fluid from the actuator in parallel with the first flow of fluid. The method may further include removing energy from the first flow of fluid, and utilizing the removed energy to increase the pressure of the second flow of fluid. The method may also include returning the first flow of fluid to the actuator.

BRIEF DESCRIPTION OF THE DRAWINGS

FIG. 3 is a control chart depicting different exemplary disclosed operating conditions associated with control of the hydraulic system of FIG. 2.

DETAILED DESCRIPTION

Figure 1:
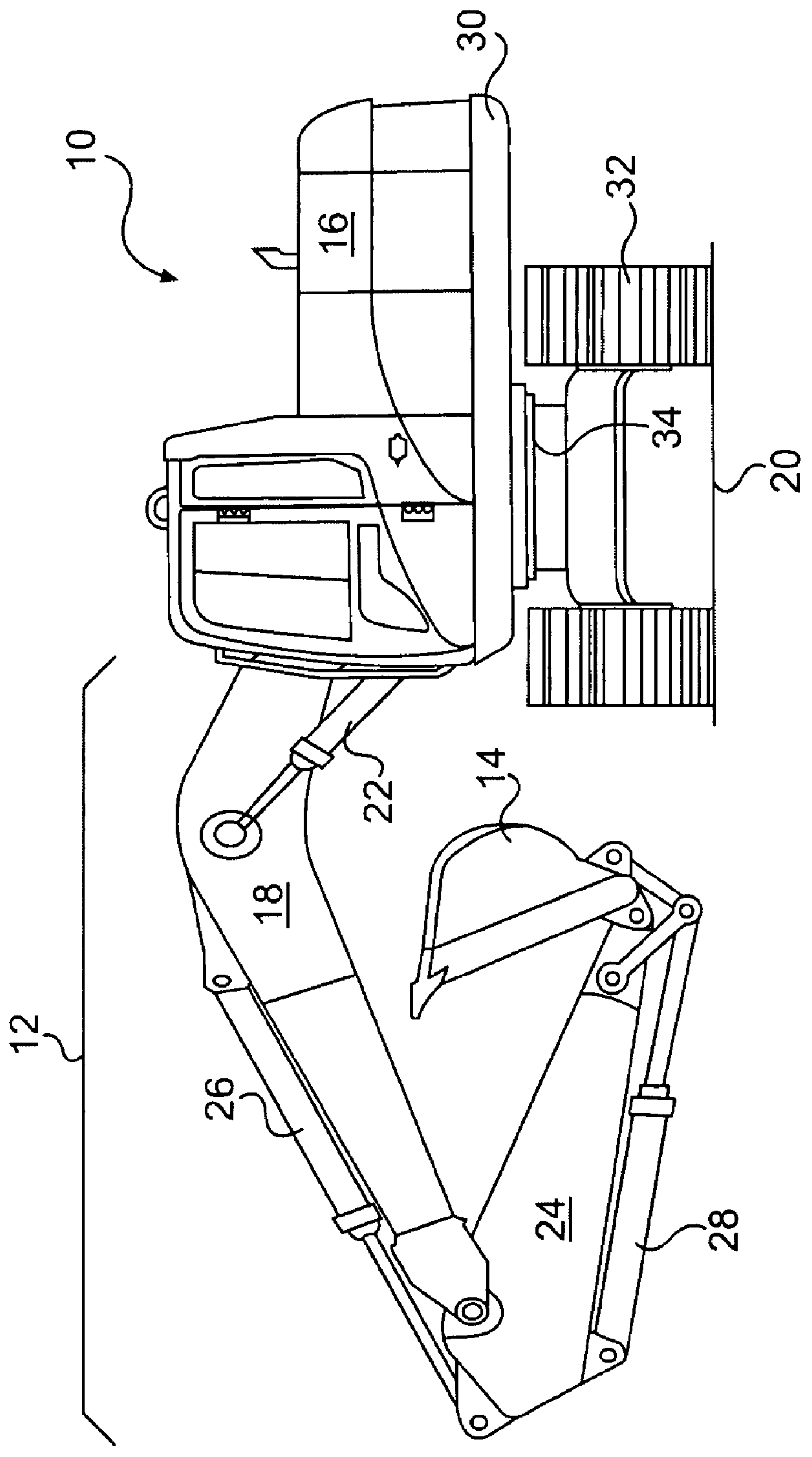
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or any other industry known in the art. For example, machine 10 may be an earth moving machine such as the excavator depicted in FIG. 1. Alternatively, machine 10 may be a dozer, a loader, a backhoe, a motor grader, a haul truck, or any other earth-moving or task-performing machine. Machine 10 may include an implement system 12 configured to move a work tool 14, and a power source 16 that drives implement system 12.

Implement system 12 may include a linkage structure moved by fluid actuators to position and operate work tool 14. Specifically, implement system 12 may include a boom member 18 that is vertically pivotal about an axis relative to a work surface 20 by a pair of adjacent, double-acting, hydraulic actuator 22 (only one shown in FIG. 1). Implement system 12 may also include a stick member 24 that is vertically pivotal about an axis in the same plane as boom member 18 by a single, double-acting, hydraulic actuator 26. Implement system 12 may further include a single, double-acting, hydraulic actuator 28 operatively connected to work tool 14 to pivot work tool 14 in the vertical direction. Boom member 18 may be pivotally connected to a frame member 30 of machine 10, which may be pivoted in a transverse direction relative to an undercarriage 32 by a hydraulic actuator 34. Stick member 24 may pivotally connect work tool 14 to boom member 18. It is contemplated that a greater or lesser number of fluid actuators may be included within implement system 12 and/or connected in a manner other than described above, if desired.

Numerous different work tools 14 may be attachable to a single machine 10 and controllable by an operator of machine 10. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot and swing relative to machine 10, work tool 14 may alternatively or additionally slide, rotate, lift, or move in any other manner known in the art in response to an operator input.

Power source 16 may embody an engine such as, for example, a diesel engine, a gasoline engine, a gaseous fuel-powered engine, or any other type of combustion engine known in the art. It is contemplated that power source 16 may alternatively embody a non-combustion source of power such as a fuel cell, an accumulator, or another source known in the art. Power source 16 may produce a mechanical or electrical power output that may then be converted to hydraulic power for moving hydraulic actuators 22, 26, 28 and 34.

Figure 2:
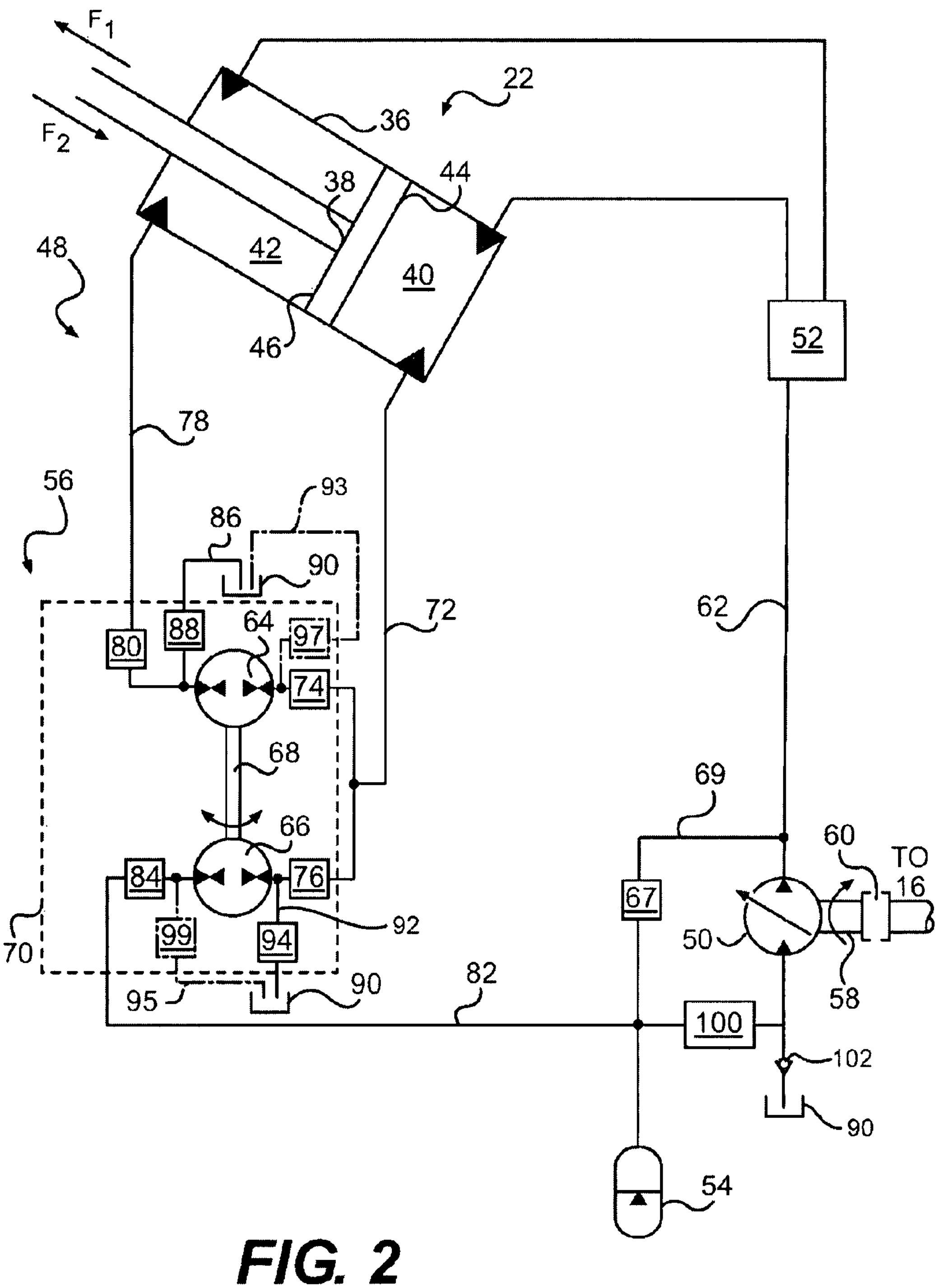
FIG. 2 is a schematic illustration of an exemplary disclosed hydraulic system for use with the machine of FIG. 1.

As illustrated in FIG. 2, hydraulic actuator 22 (for purposes of simplicity and because each of hydraulic actuators 22, 26, and 28 may be substantially similar, only hydraulic actuator 22 is depicted in FIG. 2 and will be described below) may include a cylinder 36 and a piston assembly 38 arranged to form two separated pressure chambers 40, 42. Pressure chambers 40, 42 may be selectively supplied with pressurized fluid and drained of the pressurized fluid to cause piston assembly 38 to displace within cylinder 36, thereby changing the effective length of hydraulic actuator 22. The flow rate of fluid into and out of pressure chambers 40, 42 may relate to a velocity of hydraulic actuator 22, while a pressure differential between pressure chambers 40, 42 may relate to a force imparted by hydraulic actuator 22 on boom member 18. The expansion and retraction of hydraulic actuator 22 may assist in moving work tool 14.

Piston assembly 38 may include a first hydraulic surface 44 and a second hydraulic surface 46 disposed opposite first hydraulic surface 44. An imbalance of force caused by fluid pressure on first and second hydraulic surfaces 44, 46 may result in movement of piston assembly 38 within cylinder 36. For example, a force on first hydraulic surface 44 being greater than a force on second hydraulic surface 46 may cause piston assembly 38 to displace to increase the effective length of hydraulic actuator 22. Similarly, when a force on second hydraulic surface 46 is greater than a force on first hydraulic surface 44, piston assembly 38 may retract within cylinder 36 to decrease the effective length of the hydraulic actuator 22.

Similar to hydraulic actuators 22, 26, and 28, hydraulic actuator 34 (referring to FIG. 1) may also be driven by a fluid pressure differential. Specifically, hydraulic actuator 34 may embody, for example, a swing motor having first and second pressure chambers (not shown) located to either side of an impeller (not shown). When the first pressure chamber is filled with pressurized fluid and the second pressure chamber is drained of fluid, the impeller may be urged to rotate in a first direction. Conversely, when the first pressure chamber is drained of fluid and the second pressure chamber is filled with pressurized fluid, the impeller may be urged to rotate in an opposite direction. The flow rate of fluid into and out of the first and second pressure chambers may determine an output rotational velocity of hydraulic actuator 34, while a pressure differential across the impeller may determine an output torque.

Machine 10 may include a hydraulic control system 48 having a plurality of fluid components in communication with hydraulic actuator 22 that cooperate to move work tool 14 (referring to FIG. 1) and machine 10. In particular, hydraulic control system 48 may include a source of pressure 50, and a control valve 52 disposed between source 50 and hydraulic actuator 22. Hydraulic control system 48 may further include an accumulator 54 and a hydraulic transformer 56. Accumulator 54 and hydraulic transformer 56 may be located upstream of source 50 and control valve 52 for energy recuperation purposes, as will be described in more detail below.

Source 50 may pressurize a fluid such as oil to a predetermined level(s). Specifically, source 50 may embody a pumping mechanism such as, for example, a variable displacement pump or motor—pump, a fixed displacement pump, or any other source known in the art. Source 50 may be drivably connected to power source 16 of machine 10 by, for example, a countershaft 58 and clutch mechanism 60, a belt (not shown), an electrical circuit (not shown), or in any other suitable manner. Alternatively, source 50 may be indirectly connected to power source 16 via a reduction gear box or in another suitable manner. Source 50 may produce a stream of pressurized fluid directed to hydraulic actuator 22 by way of control valve 52. The output of source 50 may be determined at least in part by the pressure of the fluid within a passageway 62 connecting source 50 to control valve 52 (i.e., source 50 may have a load-sensing control mechanism, which is not shown, that changes the displacement of source 50 based on a pressure within passageway 62).

Control valve 52 may regulate the motion of hydraulic actuator 22. Specifically, control valve 52 may have elements movable to allow pressurized fluid to flow to either of pressure chambers 40, 42 fluid via passageway 62. In one example, control valve 52 may include a first valve element (not shown) movable between a first position at which pressurized fluid may flow from passageway 62 to pressure chamber 40, and a second position at which fluid flow through control valve 52 to pressure chamber 40 is blocked. The first valve element may be movable to any position between the first and second positions to vary the flow rate and/or pressure of the fluid supplied to pressure chamber 40. In this embodiment, a similar second valve element (not shown) of control valve 52 may be supplied for control of fluid to pressure chamber 42. Alternatively, a single valve element may be provided to control the flow and/or pressure of fluid supplied to pressure chambers 40, 42. In either embodiment, the element(s) of control valve 52 may be solenoid movable against a spring bias in response to a commanded flow rate. In particular, hydraulic actuator 22 may move at a velocity that corresponds to the flow rate of fluid into and out of pressure chambers 40, 42. To achieve a desired velocity, a command based on an assumed or measured pressure may be sent to the solenoid(s) of control valve 52 that causes the elements to open an amount corresponding to the flow rate. The command may be in the form of a flow rate command or a valve element position command. Alternatively, the element(s) of control valve 52 may be pilot operated, pneumatically operated, mechanically operated, or operated in any other manner in response to a position command, a pressure command, or any similar command known in the art.

Accumulator 54 may embody a pressure vessel filled with a compressible gas that is configured to store pressurized fluid for future use as a source of fluid power. The compressible gas may include, for example, nitrogen or another appropriate compressible gas. As fluid in communication with accumulator 54 exceeds a predetermined pressure, it may flow into accumulator 54. Because the nitrogen gas is compressible, it may act like a spring and compress as the fluid flows into accumulator 54. When the pressure of the fluid within passageways communicated with accumulator 54 drops, the compressed nitrogen within accumulator 54 may expand and urge the fluid from within accumulator 54 to exit. It is contemplated that accumulator 54 may alternatively embody a spring biased type of accumulator or any other type of power storage device known in the art, if desired.

Accumulator 54 may be connected to supply source 50 with pressurized fluid and, thereby, drive source 50 as a motor-pump. Specifically, fluid from accumulator 54 having a first pressure may be directed through source 50. As the fluid passes through source 50, the displacement of source 50 may be increased such that the passing fluid drives source 50 as a motor and a pump to increase the pressure of some of the fluid passing therethrough. In this manner, the fluid from accumulator 54 may be used to amplify the pressure of the fluid supplied by source 50 to hydraulic actuator 22.

A control valve 67 may be associated with accumulator 54 to allow fluid from accumulator 54 to selectively bypass source 50. Specifically, control valve 67 may be located within a passageway 69 that fluidly connects accumulator 54 with a location downstream of source 50. In this manner, pressurized fluid may be controllably sent to source 50 via a passageway 82 or around source 50 via passageway 69, as desired. When bypassing source 50, the pressure of the fluid supplied to hydraulic actuator 22 may be substantially the same as the fluid within accumulator 54.

In one embodiment, source 50 may be required to replenish accumulator 54 with pressurized fluid. In order to accommodate these situations, source 50 may be connected to a unidirectional flow of fluid from a low pressure tank 90 by way of a check valve 102. The fluid drawn from low pressure tank 90 may be pressurized and directed to accumulator 54 by way of fluid passageway 69 and control valve 67. In order to prevent undesired fluid flow back to an inlet of source 50, an additional control valve 100 may be disposed within passageway 82, between accumulator 54 and source 50.

Hydraulic transformer 56 may include multiple components fluidly interconnected to recover energy from and condition fluid draining from hydraulic actuator 22 and from accumulator 54. Specifically, hydraulic transformer 56 may include a first pumping mechanism 64, and a second pumping mechanism 66 connected to first pumping mechanism 64 by way of a common shaft 68. First pumping mechanism 64 may be operated as a motor in a first direction by pressurized fluid to impart torque to second pumping mechanism 66 in the first direction, and operated as a motor by pressurized fluid in a second direction opposite the first direction to impart torque to second pumping mechanism 66 in the second direction. When receiving torque from first pumping mechanism 64, second pumping mechanism 66 may be operated as a pump in the first or second directions to increase the pressure of a fluid. In similar fashion, second pumping mechanism 66 may be operated as a motor in the first and second directions by pressurized fluid to impart torque to first pumping mechanism 64 in both the first and second directions such that first pumping mechanism may be operated as a pump to increase the pressure of a fluid passing therethrough. Thus, both first and second pumping mechanisms 64, 66 may be reversible (i.e., operated in the first and second directions) and selectively operated as both a pump and a motor. In fact, first and second pumping mechanisms 64, 66, in one embodiment, may be substantially identical rotary actuators such as, for example, gear pumps or piston pumps. Alternatively, first and second pumping mechanisms 64, 66 may have different displacements.

First pumping mechanism 64, second pumping mechanism 66, and common shaft 68 may be disposed within a common housing 70, and a plurality of ports may fluidly connect first and second pumping mechanisms 64, 66 to hydraulic actuator 22, accumulator 54, and/or source 50. For example, both of first and second pumping mechanisms 64, 66 may be connected in parallel to pressure chamber 40 by way of a passageway 72. A pair of control valves 74, 76 may be located between pressure chamber 40 and first and second pumping mechanisms 64, 66, respectively. First pumping mechanism 64 may be connected to pressure chamber 42 by way of a passageway 78, and a control valve 80 may be located within passageway 78 to control the flow of fluid therethrough. Second pumping mechanism 66 may be connected to source 50 and accumulator 54 by way of passageway 82, and a control valve 84 may be located within passageway 82 to control the flow of fluid therethrough. A passageway 86 and control valve 88 located therein may fluidly connect first pumping mechanism 64 to low pressure tank 90, at a location between first pumping mechanism 64 and control valve 80. Similarly, a passageway 92 and control valve 94 located therein may fluidly connect second pumping mechanism 66 to low pressure tank 90, at a location between second pumping mechanism 66 and control valve 76.

In one embodiment, two additional passageways 93, 95 and two additional control valves 97, 99 located therein, respectively, may fluidly connect first pumping mechanism 64 to low pressure tank 90 at a location between first pumping mechanism 64 and control valve 74, and second pumping mechanism 66 to low pressure tank 90 at a location between second pumping mechanism 66 and control valve 84. In this manner, the orientation of hydraulic transformer 56 relative to the remaining components of hydraulic system 48 may be reversed (i.e., control valves 80 and 84 may be fluidly connected to passageway 72, control valve 74 may be fluidly connected to passageway 78, and control valve 76 may be fluidly connected to passageway 82) and still have similar benefit.

Control valves 74, 76, 80, 84, 88 and 94 may regulate the operation of hydraulic transformer 56. Specifically, each of control valves 74, 76, 80, 84, 88 and 94 may have elements movable to allow pressurized fluid to flow between either of pressure chambers 40, 42, one or both of first or second pumping mechanisms 64, 66, low pressure tank 90, accumulator 54, and/or source 50 based on the operating position of control valves 74, 76, 80, 84, 88 and 94. That is, control valves 74, 76, 80, 84, 88 and 94 may each include a valve element (not shown) movable in response to a flow of pilot fluid between a first position at which pressurized fluid may flow therethrough, and a second position at which the fluid flow is blocked. The valve element(s) may be movable to any position between the first and second positions to vary the flow rate and/or pressure of the fluid flow. Alternatively, the element(s) of control valve 52 may be solenoid operated, pneumatically operated, mechanically operated, or operated in any other manner in response to a position command, a pressure command, or another similar command known in the art. A more detailed operation of control valves 74, 76, 80, 84, 88 and 94 and their effect on hydraulic transformer 56 will be described in more detail below.

It is further contemplated that any one or all of control valves 74, 76, 80, 84 may be load check valves. That is, upon loss of power to hydraulic control system 48, control valves 74, 76, 80, and 84 may be spring biased or otherwise urged to flow blocking positions. In this manner, upon malfunction or failure of hydraulic control system 48, the flow of fluid through hydraulic transformer 56 may be restricted or even completely stopped. By stopping the fluid flow through transformer 56, the motion of the associated hydraulic actuator may also be stopped, thereby preventing unintentional and/or undesired movements of work tool 14.

FIG. 3 is a control chart depicting exemplary operating conditions associated with control of hydraulic control system 48. FIG. 3 will be discussed further in the following section to better illustrate the disclosed system and its operation.

INDUSTRIAL APPLICABILITY

The disclosed hydraulic system may be applicable to any hydraulic actuator where efficiency and low system cost are important. The disclosed hydraulic system may improve efficiency by recuperating energy and amplifying pressures from fluid expelled from the hydraulic actuator. In addition to lowering loads placed on an associated engine, by recuperating energy and transforming pressures and flows, a smaller and lower cost source of pressure may be utilized. The operation of hydraulic control system 48 will now be explained.

With respect to FIG. 3, hydraulic actuator 22 may be retracted at a variety of different force levels by selectively opening and closing control valves 52, 67, 74, 76, 80, 84, 88, and 94. For example, in a first mode of retraction operation, control valves 52, 67, 88, and 94 may be closed, while control valves 74, 76, 80, and 84 may be opened. In this situation, source 50 may be disconnected from power source 16 (i.e., clutch mechanism 60 may be disengaged). In this mode of operation, an external force in the direction of arrow $F_2$ (referring to FIG. 2) may be applied to hydraulic actuator 22, which may correspond, for example with boom member 18 lowering under only the force of gravity. When the external force $F_2$ is applied to hydraulic actuator 22, fluid may be forced from pressure chamber 40 by the weight of boom member 18, stick member 24, work tool 14, and any load on work tool 14. As the fluid is forced from pressure chamber 40, it may flow through passageway 72, control valves 74, 76, and first and second pumping mechanisms 64, 66 in parallel. Because piston assembly 38 is retracting into cylinder 36 responsive to external force $F_2$, the pressure within pressure chamber 42 may be low, when compared with the pressure in pressure chamber 40 and, thus, the pressure differential across first pumping mechanism 64 may be significant. This significant pressure differential may generate a torque on first pumping mechanism 64 that is transferred to second pumping mechanism 66 by way of common shaft 68. With the added torque, second pumping mechanism 66 may increase the pressure of the fluid passing from pressure chamber 40 therethrough and direct this higher pressure fluid to accumulator 54 for later use. Because the fluid flowing into pressure chamber 42 may come from pressure chamber 40, power source 16 may be required to expend no power to complete this first retraction operation. In addition, because the high pressure fluid captured within accumulator 54 may be used for later operations, the efficiency of hydraulic control system 48 may be further increased in these future operations.

In a second retraction mode of operation, an external force on force acting on actuator 22 in direction $F_1$ may cause the pressure directed into pressure chamber 42 to be greater than in the first retraction mode, requiring an at least partially powered retracting movement of hydraulic actuator 22. In this situation, the pressure within chamber 42 may be greater than the pressure within chamber 40. In this mode, control valve 52 may be opened to connect fluid from passageway 62 with pressure chamber 42. In addition, control valves 67, 74, 76, 84, and 88 may be opened, while control valves 80 and 94 may be closed. In this same situation, source 50 may be disconnected from power source 16, such that power source 16 still provides no power to the operation. As the fluid exits pressure chamber 40, it may flow through passageway 72, control valves 74 and 76, and first and second pumping mechanisms 64, 66 in parallel, similar to the first retraction mode. However, in contrast from the first retraction mode, the fluid may be directed from first pumping mechanism 64 through control valve 88 and passageway 86 to low pressure tank 90. Because the pressure within low pressure tank 90 may be less than the pressure in chamber 40 (and lower than the pressure within chamber 42), the pressure differential across first pumping mechanism 64 may be significant and greater than in the first retraction mode. This increased pressure differential may generate a greater torque on first pumping mechanism 64 that is transferred to second pumping mechanism 66 by way of common shaft 68. With the added torque, second pumping mechanism 66 may increase the pressure of the fluid passing therethrough and direct this higher pressure fluid to accumulator 54 and on to passageway 62 via bypass passageway 69 and control valve 67. Again, because the fluid flowing into pressure chamber 42 may come from pressure chamber 40 (by way of accumulator 54), power source 16 may still not be required to expend any power to complete this second retraction operation. In addition, the high pressure fluid captured within accumulator 54 may be used to force the retraction of piston assembly 38 into cylinder 36.

In a third retraction mode of operation, the pressure directed into pressure chamber 42 may be substantially the same as in the second retraction mode. In this mode, control valve 52 may be opened to connect fluid from passageway 62 with pressure chamber 42. In addition, control valves 74, 76, 84, and 88 may be opened, while control valves 67, 80, and 94 may be closed. In this same situation, source 50 may be disconnected from power source 16, such that power source 16 still provides no power to this operation. As the fluid exits pressure chamber 40, it may flow through passageway 72, control valves 74 and 76, and first and second pumping mechanisms 64 and 66 in parallel, similar to the first two retraction modes. Similar to the second retraction mode, the fluid may be directed from first pumping mechanism 64 through control valve 88 and passageway 86 to low pressure tank 90 and, because the pressure within low pressure tank 90 may be less than the pressure in chamber 40, the pressure differential across first pumping mechanism 64 may be significant. This significant pressure differential may generate a torque on first pumping mechanism 64 that is transferred to second pumping mechanism 66 by way of common shaft 68. With the added torque, second pumping mechanism 66 may increase the pressure of the fluid passing therethrough and direct this higher pressure fluid to accumulator 54. In contrast from the second retraction mode, the fluid may be directed from accumulator 54 through an alternative route to source 50. This fluid may then flow from source 50 in to passageway 62. Again, because the fluid flowing into pressure chamber 42 may come from pressure chamber 40 (by way of accumulator 54 and source 50), power source 16 may still be required to expend no power to complete this third retraction operation.

In a fourth and final retraction mode of operation, the pressure directed into pressure chamber 42 may be the greatest of any of the previously described retraction modes. In this mode, control valve 52 may be opened to connect fluid from passageway 62 with pressure chamber 42. In addition, control valves 74, 76, 84, and 88 may be opened, while control valves 67, 80, and 94 may be closed. In contrast to the first three retraction modes, in this fourth retraction mode, source 50 may be drivingly connected to power source 16 (i.e., clutch mechanism 60 may be engaged). As the fluid exits pressure chamber 40, it may flow through the exact same path as in the third retraction mode, but this time with added power from power source 16. This highest pressure fluid may then flow from source 50 through passageway 62 to retract piston assembly 38 with the greatest amount of force. Although, in this scenario, power source 16 may be required to expend power to complete the intended operation, utilizing the pressurized fluid exiting pressure chamber 40 may still improve the efficiency of hydraulic control system 48 and reduce the flow capacity requirement of source 50.

Similar to the retraction modes of operation described above, piston assembly 38 may be extended from cylinder 36 at a variety of different force levels by selectively opening and closing control valves 52, 67, 74, 76, 80, 84, 88, and 94. For example, in a first mode of extension operation, control valves 52, 67, 88, and 94 may be closed, while control valves 74, 76, 80, and 84 may be opened. In this situation, source 50 may be disconnected from power source 16 (i.e., clutch mechanism 60 may be disengaged). In this mode of operation, a force in the direction of arrow $F_2$ may be applied to piston assembly 38, which may correspond, for example, with frame member 30 lowering relative to boom member 18 under the force of gravity. With the application of force $F_2$ and a supplemental flow of fluid from accumulator 54 into first chamber 40, fluid may be forced from pressure chamber 42, through passageway 78, control valve 80, and first pumping mechanisms 64. Simultaneously, high pressure fluid from accumulator 54 may be directed through passageway 82, control valve 84, and second pumping mechanism 66. The fluid from both first and second pumping mechanisms may then be directed via control valves 74 and 76 in parallel to passageway 72 and pressure chamber 40. Because piston assembly 38 is extending from cylinder 36, the pressure within chamber 40 may be less than the pressure in accumulator 54 and, thus, the pressure differential across second pumping mechanism 66 may be significant. This significant pressure differential may generate a torque on second pumping mechanism 66 that is transferred to first pumping mechanism 64 by way of common shaft 68. With the added torque, first pumping mechanism 64 may increase the pressure of the fluid passing from pressure chamber 42 therethrough and direct this higher pressure fluid to pressure chamber 40. Because the fluid flowing into pressure chamber 40 may come from pressure chamber 42 and accumulator 54, power source 16 may not be required to expend any power to complete this first extension operation.

In a second extension mode of operation, the pressure directed into pressure chamber 40 may be greater than in the first extension mode and correspond with an at least partially powered extension of hydraulic actuator 22. In this mode, control valve 52 may be opened to connect fluid from passageway 62 with pressure chamber 40. In addition, control valves 67, 74, 80, 84, and 94 may be opened, while control valves 76 and 88 may be closed. In this same situation, source 50 may be disconnected from power source 16, such that power source 16 still does not add power to the operation. As the fluid exits pressure chamber 42, it may flow through passageway 77, control valve 80, and first pumping mechanisms 64, similar to the first extension mode. However, in contrast from the first extension mode, the fluid may be directed from accumulator 54 through passageway 82, control valve 84, second pumping mechanism 66, passageway 92, and control valve 94 to low pressure tank 90, and simultaneously from accumulator 54 through control valve 67, passageway 69, passageway 62, and control valve 52 to pressure chamber 40. Because the pressure within low pressure tank 90 may be less than the pressure in accumulator 54 (and lower than the pressure within pressure chamber 40), the pressure differential across second pumping mechanism 66 may be significant and greater than in the first extension mode. This increased pressure differential may generate a greater torque on second pumping mechanism 66 that is transferred to first pumping mechanism 64 by way of common shaft 68. With the added torque, first pumping mechanism 64 may increase the pressure of the fluid passing therethrough and direct this higher pressure fluid to pressure chamber 40, simultaneous to the high pressure fluid from accumulator 54 flowing directly to pressure chamber 40. Again, because the fluid flowing into pressure chamber 40 may come from pressure chamber 42 (by way of first pumping mechanism 64 and accumulator 54), power source 16 may still not be required to expend any power to complete this second extension operation.

In a third extension mode of operation, the pressure directed into pressure chamber 40 may be about the same as in the second extension mode. In this mode, control valve 52 may be opened to connect fluid from passageway 62 with pressure chamber 40. In addition, control valves 74, 80, 84, and 94 may be opened, while control valves 67, 76, and 88 may be closed. In this same situation, source 50 may be disconnected from power source 16, such that power source 16 still does not add any power to this operation. As the fluid exits pressure chamber 42, it may flow through passageway 78, control valve 80, and first pumping mechanisms 64, similar to the first two retraction modes. Similar to the second retraction mode, fluid from accumulator 54 may be simultaneously directed through control valve 94 and passageway 92 to low pressure tank 90 and, because the pressure within low pressure tank 90 may be less than the pressure in low pressure tank 90, the pressure differential across second pumping mechanism 66 may be significant. This significant pressure differential may generate a torque on second pumping mechanism 66 that may be transferred to first pumping mechanism 64 by way of common shaft 68. With the added torque, first pumping mechanism 64 may increase the pressure of the fluid passing therethrough and direct this higher pressure fluid to pressure chamber 40. In contrast from the second extension mode, the fluid directed from accumulator 54 may flow through an alternate route to source 50 and then into pressure chamber 40. Again, because the fluid flowing into pressure chamber 40 may come from pressure chamber 42 (by way of accumulator 54 and source 50), power source 16 may still not be required to expend any power to complete this third extension operation.

In a fourth and final extension mode of operation, the pressure directed into pressure chamber 40 may be the greatest of any extension modes. In this mode, control valve 52 may be opened to connect fluid from passageway 62 with pressure chamber 40. In addition, control valves 74, 80, 84, and 94 may be opened, while control valves 67, 74, and 88 may be closed. In contrast to the first three retraction modes, in this fourth retraction mode, source 50 may be drivingly connected to power source 16 (i.e., clutch mechanism 60 may be engaged). As the fluid exits accumulator 54 toward passageway 62, it may flow through the exact same path as in the third extension mode, but this time with added power from power source 16. This highest pressure fluid may then flow from source 50 through passageway 62 to extend piston assembly 38 with the greatest amount of force. Although, in this scenario, power source 16 may be required to expend power to complete the intended operation, utilizing the pressurized fluid exiting pressure chamber 42 may still improve the efficiency of hydraulic control system 48 and lower the pumping capacity required of source 50.

In some or both of the extension and retraction modes mentioned above, source 50 may be required to replenish the supply of pressurized fluid within accumulator 54. For example, during extension and retraction modes 2-4, when the fluid within accumulator 54 is being utilized to move actuator 22, the demand for fluid within accumulator 54 may exceed the supply with accumulator 54 and/or the supply of fluid to accumulator 54 from hydraulic actuator 22. In these circumstances, clutch mechanism 60 may be selectively engaged to cause source 50 to produce pressurized fluid that is then directed via passageway 69 and control valve 67 to fill accumulator 54 to a predetermined pressure level. When replenishing accumulator 54, the flow of fluid through control valve 52 may or may not be blocked, while control valve 100 may be moved to the a closed position. It is contemplated that in some modes of operation, when replenishing accumulator 54, movement of hydraulic actuator 22 may be prevented. In addition, at the start-up of machine 10, source 50 may be required to first fill accumulator 54, before movement of hydraulic actuator 22 may commence. Similarly, at shut down, it may be required to drain accumulator 54 of pressurized fluid.

The disclosed hydraulic system and transformer may have extended use, as compared to the prior art. Specifically, because the disclosed transformer is bidirectional, with fluid flowing from either pressure chamber in an actuator through the transformer to a storage device and source, and from the storage device through the transformer to the actuator, energy recuperation from both chambers and source pressure amplification may be possible. In addition, because of the flow bidirectionality of the disclosed transformer, its application to other machines and machine systems may be great.

The disclosed hydraulic system and transformer may also improve the efficiency of the associated driving engine, while simultaneously lowering the required flow capacity of the pressurizing source. That is, because energy may be extracted from already pressurized fluid, the work expended by the engine to pressurize the fluid may be minimized. And, because the disclosed transformer may be able to extract energy from fluid that is at even relatively low pressures, energy recuperation may be available a significant amount of the operational time of hydraulic system. That is, because a low pressure flow of fluid may be utilized to amplify, accumulate, and/or redirect a higher pressure flow of fluid, the opportunities may be more frequent than in convention regeneration type hydraulic systems and the amount of energy recuperated and may be great. Because the fluid, both high and low pressure flows, may be redirected from an emptying chamber to a filling chamber and/or accumulated for later use, the flow capacity of the pressure source may be lowered. This lowered flow capacity of the pressure source coupled with a simple fixed displacement transformer may help to reduce the cost and complexity of the disclosed hydraulic system It will be apparent to those skilled in the art that various modifications and variations can be made to the disclosed hydraulic transformer. Other embodiments will be apparent to those skilled in the art from consideration of the specification and practice of the disclosed hydraulic transformer. It is intended that the specification and examples be considered as exemplary only, with a true scope being indicated by the following claims and their equivalents.

What is claimed is:

1. A hydraulic transformer, comprising:

a housing;

a first bidirectional pumping mechanism disposed within the housing and configured to be selectively rotated by pressurized fluid to generate a torque and driven to pressurize fluid;

a second bidirectional pumping mechanism disposed within the housing and configured to be selectively rotated by pressurized fluid to generate a torque and driven to pressurize fluid;

a shaft connecting the first and second pumping mechanisms such that each of the first and second pumping mechanisms is operable to drive the other of the first and second pumping mechanisms, a first passage configured to direct pressurized fluid to the first pumping mechanism in a first rotational direction during a first operation;

a second passage configured to direct pressurized fluid to the second pumping mechanism in the first rotational direction during the first operation;

a third passage configured to direct pressurized fluid to the first pumping mechanism in a second rotational direction during a second operation;

a fourth high-pressure passage in selective fluid communication with the second pumping mechanism; and at least a fifth low-pressure passage in selective fluid communication with at least one of the first and second pumping mechanisms.

2. The hydraulic transformer of claim 1, wherein the first and second pumping mechanisms have fixed displacements.

3. The hydraulic transformer of claim 1, wherein the first and second pumping mechanisms are gear pumps.

4. The hydraulic transformer of claim 3, wherein the first and second gear pumps are substantially identical.

5. The hydraulic transformer of claim 1, further including:

at least a first control valve disposed between the first passage and the fourth high-pressure passage; and at least a second control valve disposed between the second passage and the fifth low-pressure passage.

6. The hydraulic transformer of claim 5, wherein the at least a first control valve and the at least a second control valve are load check valves.

7. The hydraulic transformer of claim 1, wherein the at least one low-pressure port includes:

at least a first low-pressure port in fluid communication with the first pumping mechanism; and at least a second low-pressure port in fluid communication with the second pumping mechanism.

8. A hydraulic circuit, comprising:

an actuator having a first pressure chamber and a second pressure chamber; and a hydraulic transformer having first and second pumping mechanisms connected to receive in parallel fluid forced from the first pressure chamber, increase the pressure of a portion of the fluid forced from the first pressure chamber, and return a remaining portion of the fluid forced from the first pressure chamber to the second pressure chamber.

9. The hydraulic circuit of claim 8, wherein the remaining portion of the fluid returned to the second pressure chamber has a pressure lower than the pressure of the fluid forced from the first pressure chamber.

10. The hydraulic circuit of claim 8, further including an accumulator positioned to collect the portion of the fluid having increased pressure.

11. The hydraulic circuit of claim 8, further including a source of pressurized fluid in selective communication with the first and second pressure chambers of the actuator.

12. The hydraulic circuit of claim 11, wherein the hydraulic transformer is positioned to direct pressurized fluid from the actuator to the source.

13. The hydraulic circuit of claim 12, wherein the hydraulic transformer is configured to drain the remaining portion of the fluid from the source to a low pressure tank.

14. A method for recuperating hydraulic energy from an actuator, comprising:

receiving a first flow of fluid from the actuator;

receiving a second flow of fluid from the actuator in parallel with the first flow of fluid;

removing energy from the first flow of fluid;

utilizing the removed energy to increase the pressure of the second flow of fluid; and returning the first flow of fluid to the actuator.

15. The method of claim 14, wherein the first and second flows of fluid have substantially identical pressures and flow rates prior to the utilizing step.

16. The method of claim 14, further including collecting the second flow of fluid after the pressure has been increased.

17. The method of claim 14, further including:

receiving a third flow of fluid from the fluid actuator;

receiving a flow of the collected fluid in parallel with the third flow of fluid;

removing energy from the flow of collected fluid;

utilizing the removed energy to increase the pressure of the third flow of fluid; and directing the third flow of fluid to the actuator.

18. The method of claim 17, further including amplifying a flow of the collected fluid; and directing the amplified flow of collected fluid to the actuator.

19. The method of claim 17, wherein the amplified flow of collected fluid is received by the actuator in a direction opposite the third flow of fluid.

20. A hydraulic transformer, comprising:

a housing;

a first bidirectional pumping mechanism disposed within the housing and configured to be selectively rotated by pressurized fluid to generate a torque and driven to pressurize fluid;

a second bidirectional pumping mechanism disposed within the housing and configured to be selectively rotated by pressurized fluid to generate a torque and driven to pressurize fluid;

a shaft connecting the first and second pumping mechanisms such that each of the first and second pumping mechanisms is operable to drive the other of the first and second pumping mechanisms, at least a first control valve disposed within the housing and configured to selectively control fluid passing through the first bidirectional pumping mechanism; and at least a second control valve disposed within the housing and configured to selectively control fluid passing through the second bidirectional pumping mechanism.

* * * * *